Sept. 30, 1924.
B. S. AIKMAN
1,510,169
CONTROL SYSTEM FOR COMPRESSORS AND THE LIKE
Original Filed May 21, 1917   6 Sheets-Sheet 1
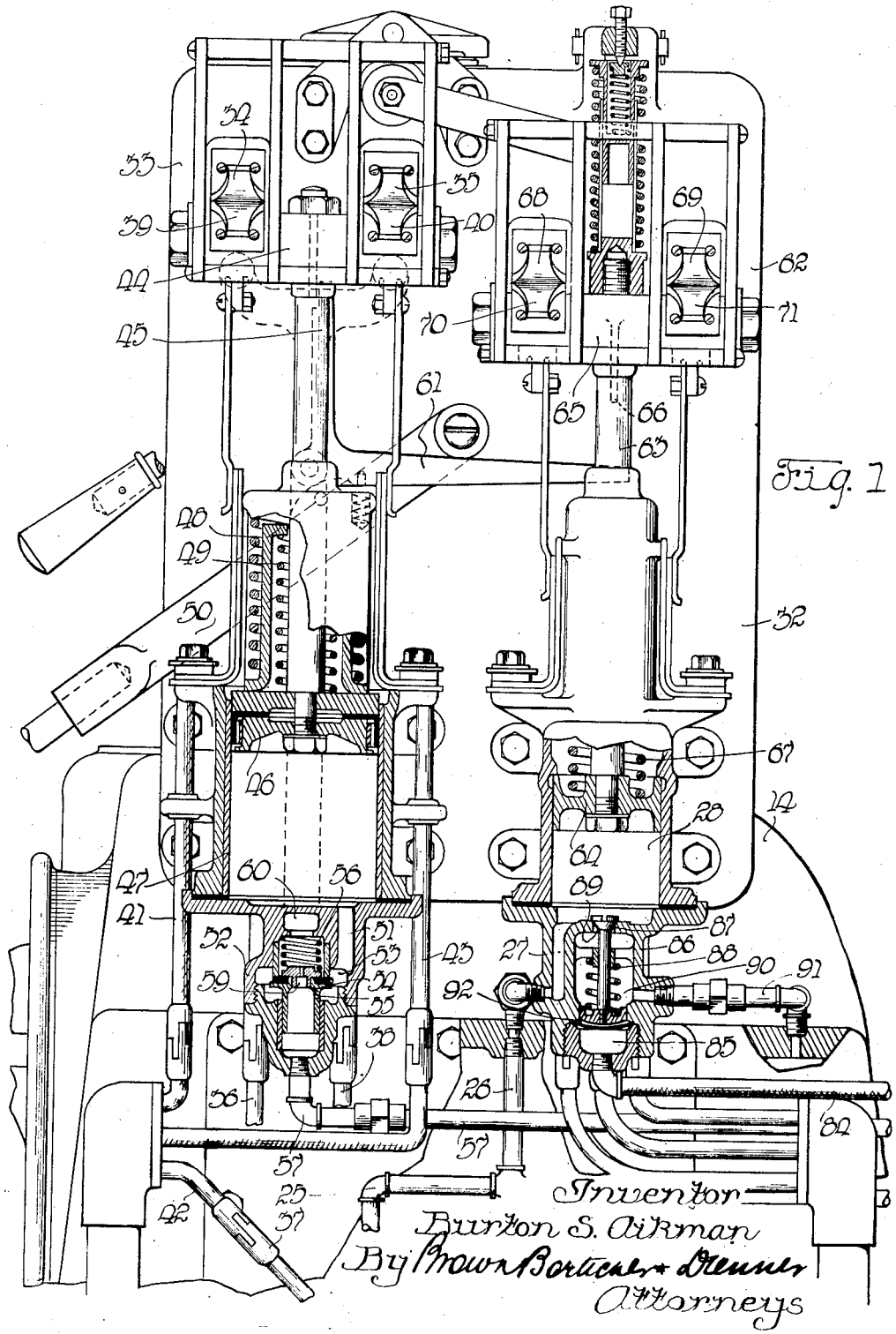

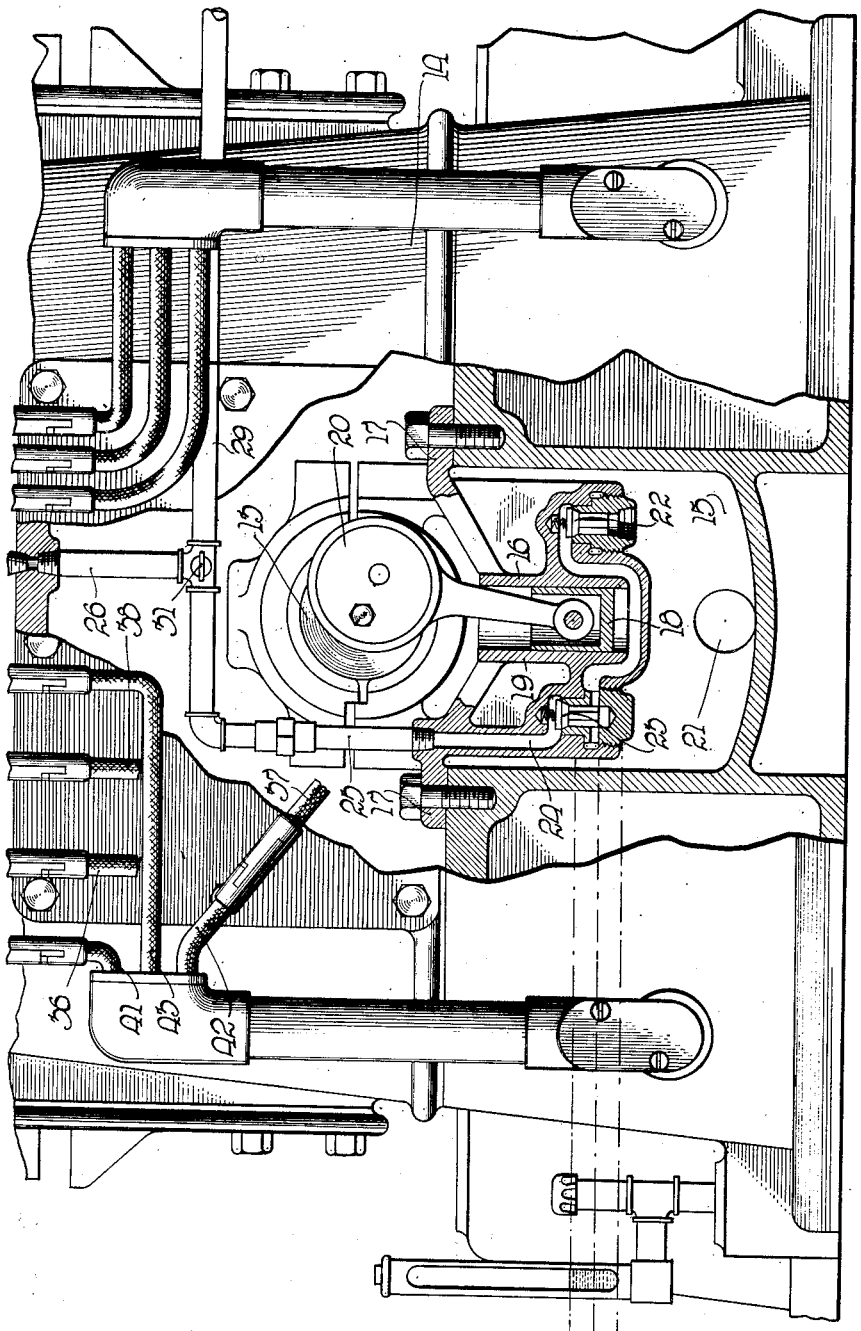

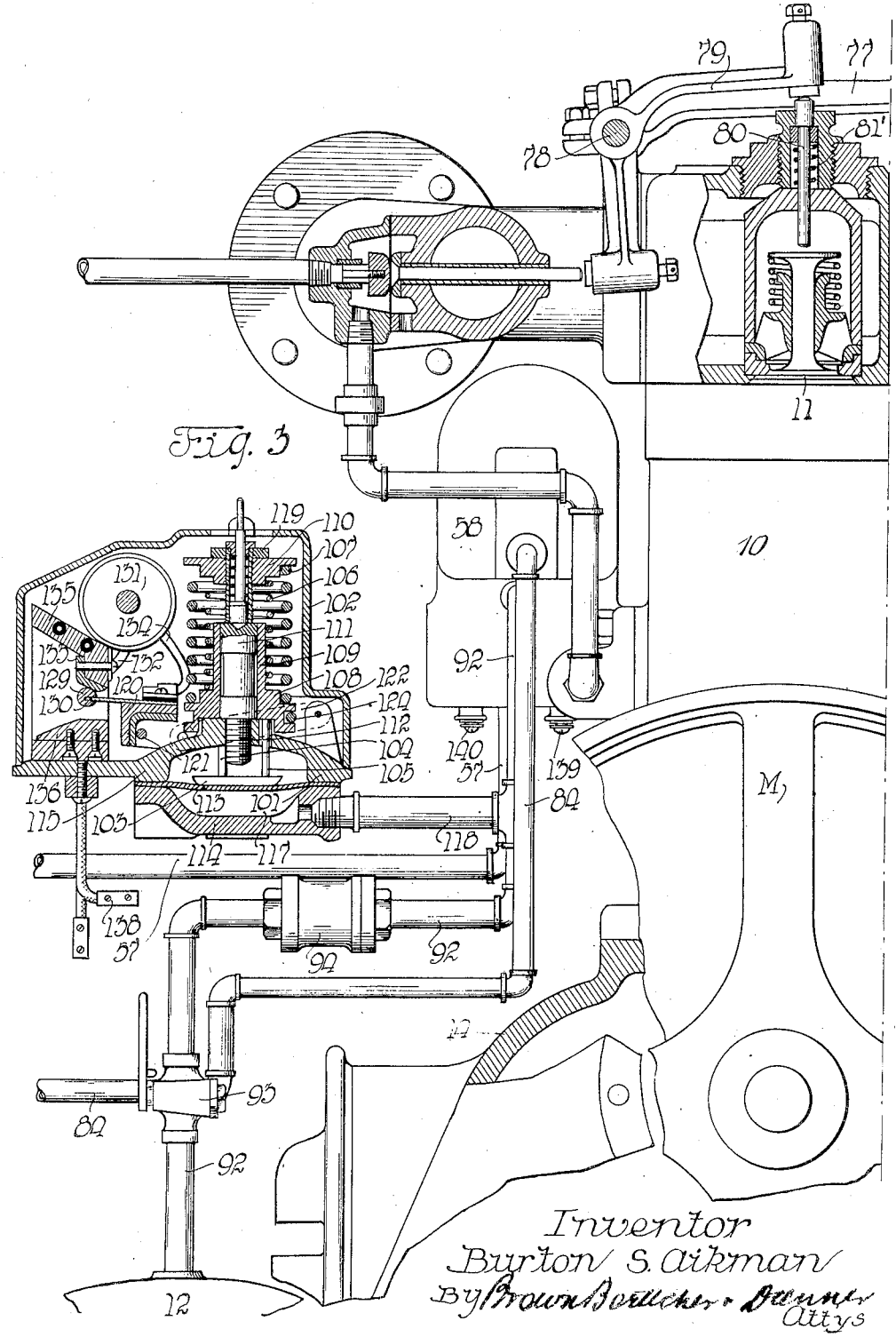

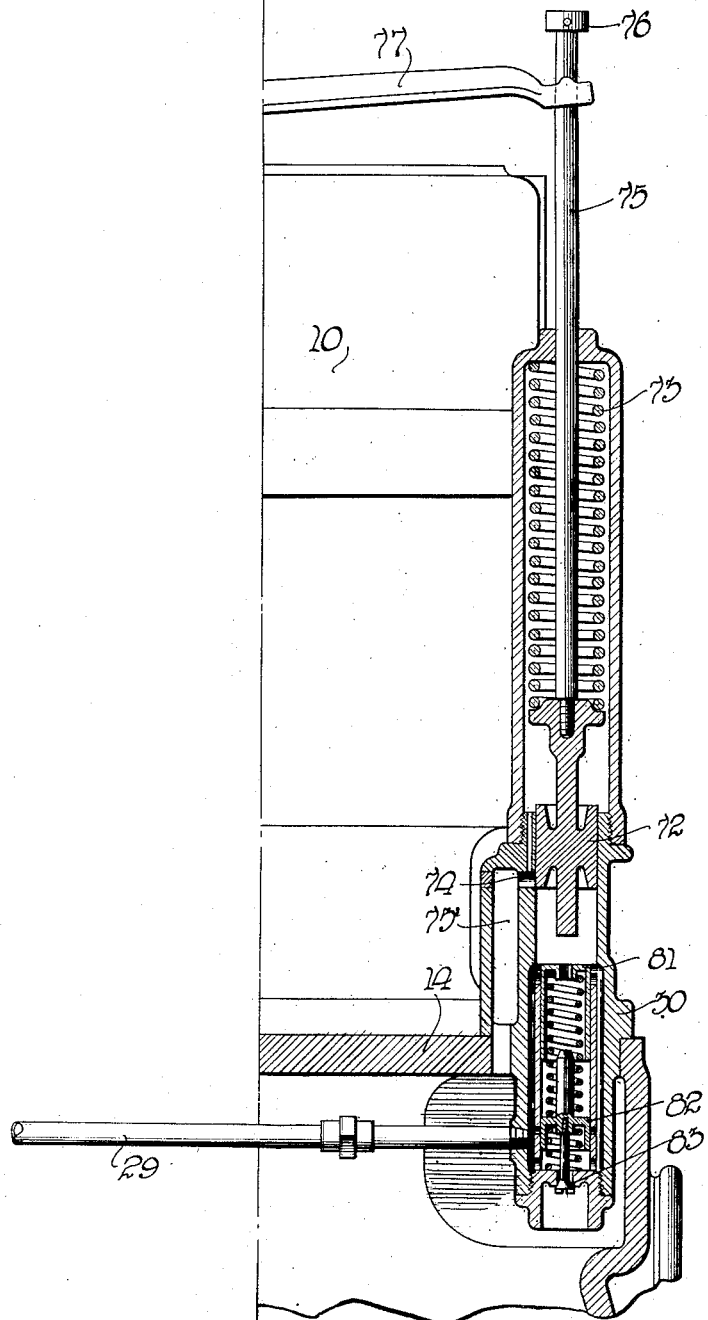

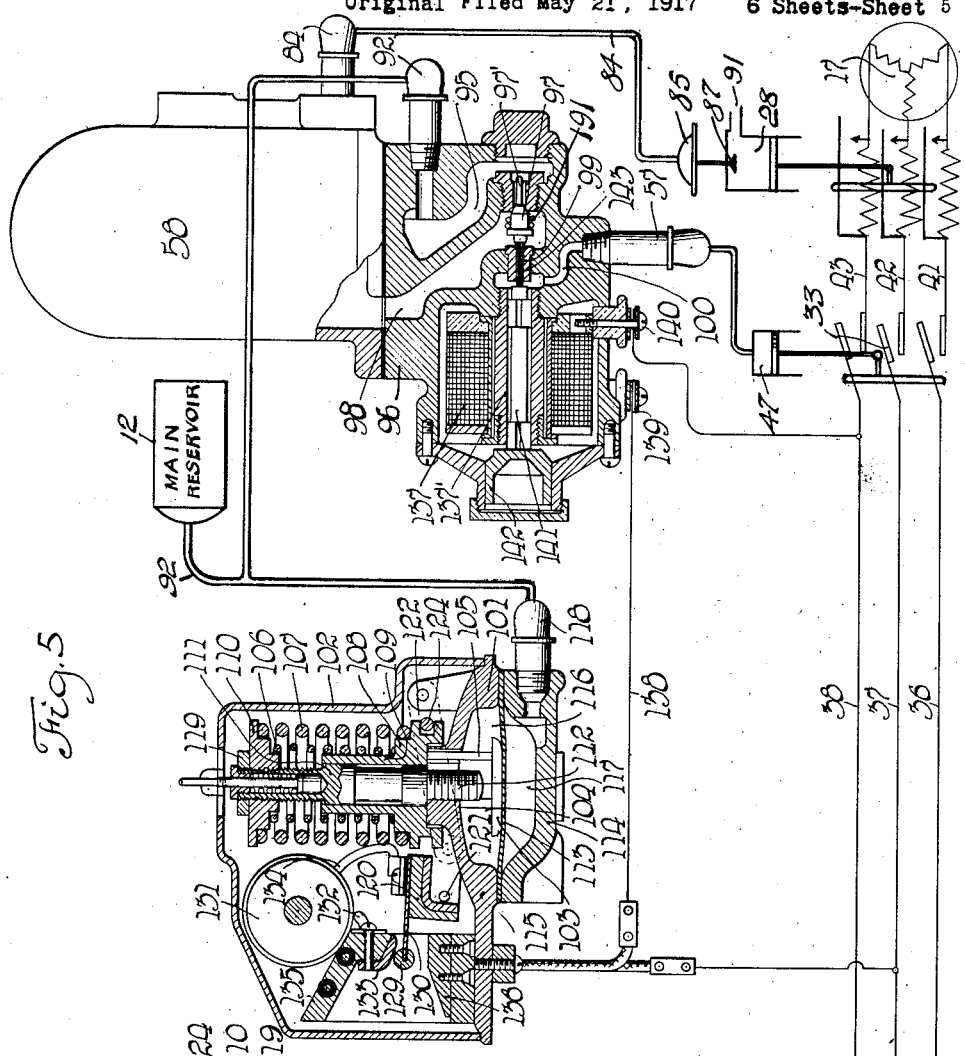

Sept. 30, 1924.
B. S. AIKMAN
1,510,169
CONTROL SYSTEM FOR COMPRESSORS AND THE LIKE
Original Filed May 21, 1917   6 Sheets-Sheet 6
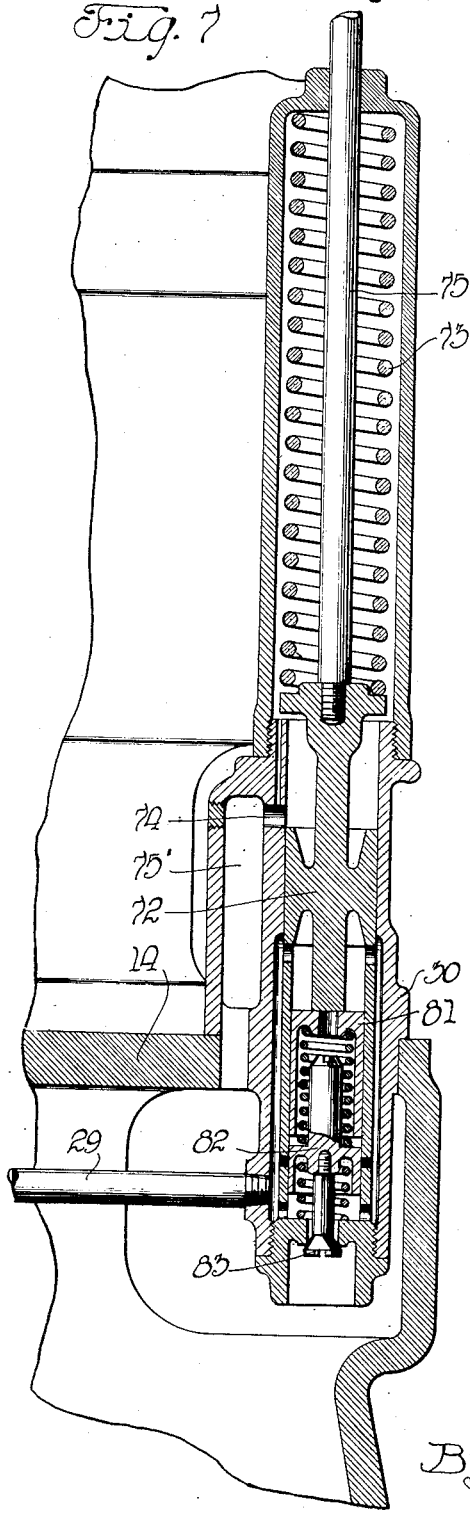
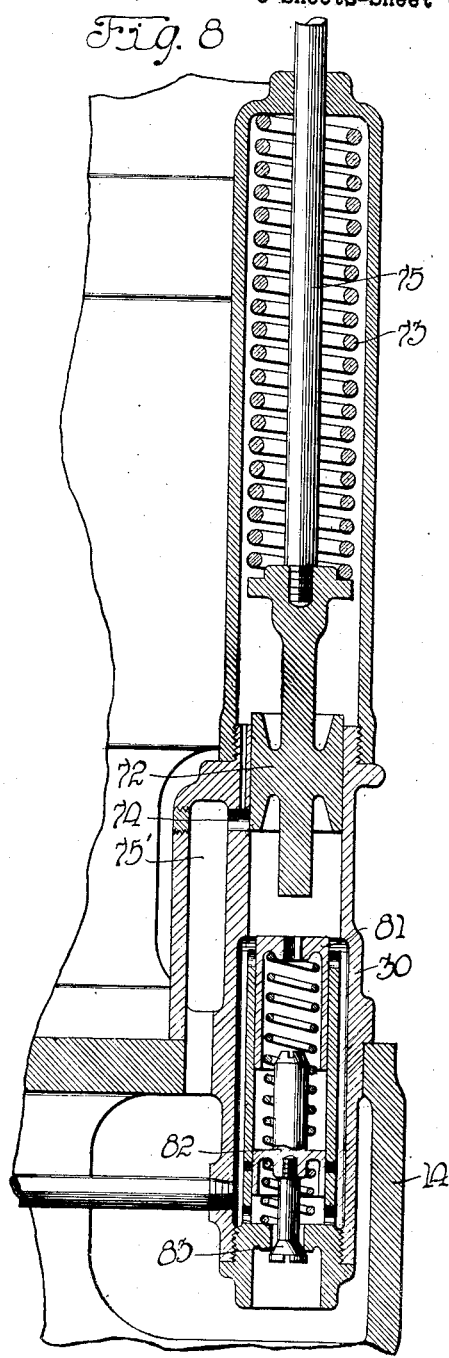
Inventor
Burton S. Aikman
By Brown Boettcher & Dienner
Attorneys Patented Sept. 30, 1924.

1,510,169

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

CONTROL SYSTEM FOR COMPRESSORS AND THE LIKE.

Original application filed May 21, 1917, Serial No. 169,997. Divided and this application filed November 5, 1919. Serial No. 335,816.

*To all whom it may concern:*

Be it known that I, BURTON S. AIKMAN, a citizen of the United States, residing at Milwaukee, in the county of Milwaukee and State of Wisconsin, have invented a certain new and useful Improvement in Control Systems for Compressors and the like, of which the following is a full, clear, concise, and exact description, reference being had to the accompanying drawings, forming a part of this specification.

This invention relates to control systems for compressors and the like.

In my copending application, Serial No. 169,997, filed May 21, 1917, now Patent No. 1,400,133, I have described a control system for motor driven compressors which automatically effects the stopping and starting of the motor and the loading and unloading of the compressor and which is particularly characterized by provisions for safe-guarding the electrical apparatus as well as the compressor against damage that might occur as a result of continued operation under improper working conditions. The starting and stopping of the motor is controlled by a governor which is under the influence of the pressure in the main fluid reservoir so that when the pressure in the reservoir reaches a predetermined minimum the motor is started and when a predetermined maximum pressure is reached the motor is stopped.

Two types of governors for this purpose are disclosed in the application above referred to. One is controlled solely by the pressure in the reservoir while the other is under the joint control of the reservoir pressure and the electrical condition of the line circuit of the motor.

The present invention is a division of the application above referred to and is directed to the governor of the second mentioned type.

The primary aim of the present invention is to provide a governor for motor driven compressors which is under the joint control of the reservoir pressure and the electrical condition of the motor circuit.

Another object is to provide a governor for motor driven compressors which will stop the motor upon the occurence of any electrical conditions that may be dangerous or undesirable and which will again start the motor when such conditions disappear.

Other objects and advantages will hereinafter appear.

One embodiment of the invention is illustrated in the accompanying drawings, in which:—

Figure 1 is a fragmentary view of one end of a compressor embodying the features of the present invention, and illustrating certain switch mechanism.

Figure 2 is a fragmentary view of the lower portion of that end of the compressor illustrated in Figure 1.

Figure 3 is a fragmentary view of the other end of the compressor and showing the application of a certain governor mechanism thereto.

Figure 4 is a fragmentary view of another portion of that end of the machine illustrated in Figure 3.

Figures 1 to 4 together constitute a comprehensive diagram of the connections and operative relations of the various parts of the control system.

Figure 5 is a diagrammatic illustration of the governor mechanism and its connections with the motor circuit.

Figure 6 is a plan view of an element of the governor illustrated in Figures 3 and 5.

Figure 7 is a section of a valve unloading cylinder showing its position when the compressor is at rest.

Figure 8 is a similar view showing the position of the unloading cylinder when the compressor is running.

The compressor may be of any standard or approved type. In the present instance the compressor is identical with that shown in the application above referred to and includes a plurality of compressor cylinders 10, each having a fluid inlet valve 11 and a fluid outlet valve (not shown) communicating through a pipe (not shown) with the main reservoir 12. The compressor pistons are driven from the crank shaft 13, mounted in a closed crank case 14, so that upon rotation of the crank shaft fluid is drawn in through the inlet valves and delivered through the outlet valves to the reservoir 12 in a well known manner. Since compressors of this general type are well known in the art, a further or more detailed description of the same is deemed unnecessary.

A novel control system for the compressor is fully described in the copending application above referred to. This control system is such that at any time the compressor fails to attain or operate at proper speed the compressor will immediately be brought to rest. This failure may be due to the operative condition of the compressor or its driving means or possibly to phase failure or other improper electrical condition of the power circuit. In any event the ill consequences resulting from the operation of the compressor or its driving means under improper working conditions, are avoided. This system depends for its action upon the pressure set up in a hydraulic system during the operation of the compressor. The hydraulic system preferably constitutes the lubricating system for the compressor so that the starting or continued operation of the compressor is impossible in the event that the lubricating system is not functioning properly due to lack of lubricant or for any other cause.

This hydraulic system and its connections with the various parts of the compressor and the driving means will now be described. The hydraulic system is fed from the usual bath of oil contained in the crank case 14, by means of a pump of any approved type, driven preferably from the crank shaft 13. In the present instance a well 15 is formed near one end of the crank case to receive the pump 16 which is held in position therein by means of suitable ears 17 formed on the pump frame. The pump includes a piston 18 operable in a cylinder 19 and actuated by an eccentric 20 secured to one end of the crank shaft 13. Oil from the crank case enters the well 15 through an opening 21 and assumes a level corresponding to the level of the oil in the crank case.

The pump inlet valve 22 communicates with this body of oil at a point slightly below the normal level thereof so that during the operation of the pump, oil is drawn through valve 22 into the pump and is then forced out through the valve 23 to a passageway 24 communicating with a pipe 25. Pipe 25 feeds the hydraulic system. When the level of oil falls below the intake of valve 22 the supply to the hydraulic system is cut off and the compressor is stopped by mechanism which will be later explained.

Pipe 25 communicates with a pipe 26, which in turn leads to a passageway 27 formed in the bottom of a switch cylinder 28 to effect the closing of a resistance cut-out switch, as will be later explained. Pipe 25 also communicates with a pipe 29, which in turn leads to an accumulating cylinder 30 for effecting the loading and unloading of the compressor. A graduated orifice 31 formed in the pipe 25 permits an escape of some of the oil back to the crank case, so that the pressure of the oil in the pipes 25, 26 and 29 varies with the speed of the pump and consequently with the speed of the compressor.

The compressor is driven by an electric motor M operatively connected at all times with the crank shaft 13, so that the operation of the compressor depends upon the operation of the motor. The switch mechanism for controlling the motor is fully described in my copending application above referred to and in my copending application Serial No. 335,815 filed Nov. 5, 1919. It will be sufficient for the present purposes to understand in a general way the operation of this switch mechanism and its relation with the hydraulic system.

This mechanism is preferably mounted upon a suitable switch board 32 conveniently mounted upon one end of the compressor (see Figure 1). The motor is started or stopped by closing or opening the main switch 33. The main switch includes a plurality of fixed contacts 34 and 35 electrically connected with the main feed wires 36 and 38, respectively. The movable contacts 39 and 40 are electrically connected with the motor through the leads 41 and 43, respectively. The third feed wire 37 is connected directly with the lead 42 of the motor. Thus it will be seen that the closing of the main switch closes the circuit between the power circuit and the motor.

The movable contacts 39 and 40 are carried upon a cross-head 44 actuated by a plunger 45. Plunger 45 is connected with a piston 46 operable in a cylinder 47. Springs 48 and 49 tend at all times to hold the switch open. The switch however may be closed by a manual manipulation of a lever such as shown at 50 or by the admission of fluid under pressure to the bottom of the cylinder 47.

Fluid is admitted to the cylinder through a passageway 51 formed in the cylinder head 52 and communicating with an annular chamber 53. A hollow cylindrical valve member 54 is reciprocably mounted in the cylinder head and is provided with a port 55 adapted to be positioned in and out of communication with the annular chamber 53. A spring 56 yieldably maintains the valve member in such position as to close port 55. When fluid is admitted through pipe 57, beneath the valve member, the valve member is lifted and the fluid passes through the port 55 to and through the passageway 51 and enters the cylinder.

The piston 46 is thus raised against the action of springs 48 and 49 and the main switch is closed.

Pipe 57 is connected with an auxiliary reservoir 58 which will be later described. This reservoir has a limited capacity. Valve member 54 is provided with a bleed opening 59 permitting a slow escape of the fluid from the pipe 57 and reservoir 58 through an exhaust passage 60 which leads to atmosphere by way of the blow-out nozzles lying back of the pairs of contacts 34—39 and 35—40. The capacity of the auxiliary reservoir is such as to effect a complete closure of the main switch and in fact to hold the switch closed for a predetermined time interval. At the end of this period however sufficient fluid has escaped through the bleed opening 59 to reduce the pressure to such point as to permit the valve member 54 to be forced down under the action of the spring 56. This opens communication between the exhaust passage 60 and the passageway 51, permitting an exhaust of the fluid in the cylinder 47. When this occurs the piston 46 is free to drop under the action of the springs 48 and 49 to open the switch.

A latch member in the form of a bellcrank lever 61 is provided however for holding the main switch closed in the event that proper working pressure has been established in the hydraulic system. Thus if the compressor has come up to the desired speed within the proper time interval the latch is moved to latching position and the main switch is held closed.

The mechanism for controlling the latch lever 61 also controls the cut-out switch 62. This mechanism includes a plunger 63 connected at one end to an actuating piston 64 and carrying at its other end a movable cross-head 65. One arm of the lever 61 extends across the path of movement of a projection 66 carried by the cross-head so that when the cross-head 65 is in its lower position the projection 66 holds the lever 61 from its latching position but as the cross-head 65 is raised the lever is free to swing to its latching position beneath the cross-head 44 of the main switch to hold the main switch closed.

The piston 64 is yieldably maintained in its lowermost position by the spring 67. After the main switch has been closed and as the compressor comes up to speed the pressure in the pipes 25 and 26 is increased in the manner hereinabove described. This creates a corresponding pressure in the passage 27 and the bottom of the cylinder 28 until the piston 64, plunger 63 and crosshead 65 are moved toward and held in their uppermost position against the action of spring 67. It will be understood that if the compressor and its driving means are in proper working condition, and sufficient oil is in the crank case, the cross-head 64 will be thus raised and the latch lever thrown to latching position to hold the main switch closed before the main switch has been released by the reduction in pressure in the pipe 57 and the auxiliary reservoir 58. Thus the continued operation of the motor and the compressor is insured. Should, however, the hydraulic pressure at any time fall below an operative minimum the piston 64, plunger 63 and cross-head 65 would fall under the action of spring 67, the latch lever 61 would be tripped to releasing position and the main switch would open. The opening of the main switch breaks the motor circuit and consequently stops the compressor.

The cut-out switch comprises a plurality of fixed contacts 68 and 69 for cooperation with a plurality of movable contacts 70 and 71, carried by the movable cross-head 65, so that when the plunger 63 moves to its uppermost position the cut-out switch is closed. The function of the cut-out switch is to short circuit a starting resistance (see Figure 5) after the motor has come up to speed. The construction and operation of this cut-out switch and the starting resistance is fully described in both of the copending applications hereinabove referred to.

The accumulating cylinder 30 and the means for loading and unloading the compressor will now be briefly described. A piston 72 is reciprocably mounted in the upper portion of the cylinder 30 and is yieldably held in the lower position, shown in Figure 7, by a spring 73 when the compressor is at rest. As hereinabove pointed out, oil from the pump 16 passes through pipes 25 and 29 and enters the bottom of the cylinder 30. As the speed of the compressor builds up the pressure of the oil increases until it overcomes the resistance of the spring 73 and causes the piston 72 to move upwardly to the position shown in Figures 4 and 8. The relative strengths of the springs 67 and 73 are preferably such that this upward movement of piston 72 does not occur until after piston 64 has reached the extreme upper position of Figure 1 and the cut-out switch has been closed. Likewise as the hydraulic pressure in the cylinder decreases the spring 73 forces the piston 72 to its lower position before the cut-out switch piston 64 has been forced downwardly by the spring 67.

The piston 72 performs a dual function. It serves as a relief valve for the hydraulic system by permitting an escape of the oil through a port 74 and passageway 75' back to the crank case 14. It also serves to operate the loading and unloading mechanism for the compressor. For this purpose a rod 75 is connected to the piston 72. This rod is provided with a head 76 for controlling the position of a lever arm 77 fixed to a rock shaft 78. Rock shaft 78 carries a plurality of arms 79, one for each compressor cylinder 10. The free end of each arm 79 engages one end of a reciprocable pin 80 normally pressed upwardly by a spring 81'. Pin 80 may be forced downwardly however under the action of arm 79 to force and hold the inlet valve 11 off its seat and thus prevent compression in the compressor cylinder and unload the compressor.

While the compressor is at rest and piston 72 is in its lowermost position, the head 76 of rod 75 holds lever arm 77 in a lower position so that each arm 79 and consequently each pin 80 are held in their lowermost positions and each valve 11 is held in its unloading position. When the compressor has come up to speed however, the piston 72 is forced upwardly in the manner above described, the lever arm 77 is released, and each of the arms 79 and each pin 80 are moved upwardly to disengage the valve 11 to load the compressor.

Since this mechanism is fully described in my co-pending application Serial No. 169,997, above referred to, it is believed that a further or more detailed description thereof in this application is unnecessary. It might be stated however that the auxiliary pistons 81 and 82 and the valve 83 are operated by the piston 72 to vent the hydraulic system and thus stop the compressor and its driving means in case the pressure in the hydraulic system has fallen below a working pressure. As above pointed out such a drop in pressure may be due to a lack of lubricating oil in the crank case or to a reduction in the speed of the compressor as a result of trouble in the electric power circuit or improper functioning of some mechanical part of the mechanism.

A governor or mechanism for effecting the automatic starting and stopping of the compressor and its driving means in accordance with the fluid pressure in the main reservoir 12 will now be described. This governor is also under the control of the motor line circuit so that the compressor is unloaded and stopped upon the occurrence of any improper condition of the electrical apparatus. After this condition has been corrected the governor effects the automatic restarting and reloading of the compressor.

In the present instance the governor is associated with the auxiliary reservoir 58, hereinabove referred to, mounted at any convenient point, such as upon one of the compressor cylinders 10. (See Figure 3.) The auxiliary reservoir is always in communication through a pipe 84 with a chamber 85 formed in the cylinder head 86 of the cut-out switch operating cylinder 28, so that when a predetermined fluid pressure has been established in the auxiliary reservoir by the admission of fluid thereto, the pressure in the hydraulic system is reduced by means which will now be described (see Figure 1).

A valve 87 is yieldably held upon its seat by a spring 88 to close a port 89 between the cylinder 28 and a chamber 90. A discharge pipe 91 leads from the chamber to the interior of the crank case 14. Valve 87 is connected with and actuated by a piston 92 arranged above the chamber 85 and influenced by the fluid pressure in the chamber 85, pipe 84 and the auxiliary reservoir 58. When the piston is raised by the fluid pressure against the action of spring 88, the port 89 is opened and oil in the cylinder 28 escapes into the chamber 90 and is returned to the crank case 14 through pipe 91. This obviously reduces the pressure in the entire hydraulic system and effects the unloading and the stopping of the compressor.

Under certain predetermined conditions fluid is admitted to the auxiliary reservoir 58 from the main reservoir 12 through a pipe 92. A manually operable valve 93 of any approved construction may be provided in the pipe 92 for controlling the flow of fluid therethrough, and a strainer 94 of any approved type may be provided for preventing particles and other sediment entering the auxiliary reservoir. Pipe 92 leads from the main reservoir to a passageway 95 formed in the base 96 of the auxiliary reservoir (see Figure 5). A valve 97 cooperating with a port 97' controls communication between passageway 95 and a passageway 98 leading into the interior of the auxiliary reservoir. This valve is movable under the influence of spring 191 to effect such communication and thus permit fluid to pass into the auxiliary reservoir and to establish a pressure therein corresponding to the pressure in the main reservoir.

A port 99 is provided between the passageway 98 and a passageway 100 formed in the base portion 96. Pipe 57 hereinabove referred to connects passageway 100 with the bottom of the cylinder head 52 in the manner previously described. Valve 97 is adapted to open and close the port 99 so that when port 97' is open, port 99 is closed and vice versa. When port 99 is open, fluid passes from the auxiliary reservoir through passageways 98 and 100 and through pipe 57 to the cylinder head 52 to close the main switch 33 in the manner previously described to start the compressor.

The mechanism for controlling the valve 97 will now be described. This mechanism is illustrated in Figures 3, 5 and 6 and preferably includes a base portion 101 for mounting at any convenient point on the compressor. The mechanism is preferably enclosed within a suitable casing 102. A diaphragm plate or piston 103 is provided with a series of stems 104 and 105 which pass up through the base and are in direct communication with the springs 106 and 107 by means of a collar 108. The collar 108 is provided at its upper end with a guiding sleeve 109. The lower ends of the springs 106 and 107 rest upon the collar 108 and the upper ends of the springs engage a collar 110. A suitable shaft 111 disposed within the guiding sleeve 109 is provided at its lower end with a stem 112 which is threaded through the base 101, forming a suitable stop for limiting the upward travel of the diaphragm plate 103.

The position of the diaphragm plate 103 is controlled by the fluid pressure in the main reservoir 12 by the following mechanism. The plate 103 rests upon a flexible diaphragm 113 held between a recessed member 114 and a rim 115 formed around a chamber 116 in the base portion 101. The chamber 117 formed in member 114 communicates at all times with the main reservoir 12 through a pipe 118 connected with the pipe 92 above referred to. Thus it will be seen that when a certain predetermined pressure has been built up in the main reservoir, the diaphragm 113 and plate 103 will be forced upwardly against the action of springs 106 and 107. The degree of pressure required to raise the plate 103 may be nicely determined by an adjustment of the tension in the springs 106 and 107. This may be accomplished by the nut 119 threaded upon the shaft 111.

The movement of the plate 103 and collar 108 is transmitted to a governing switch mechanism as will now be described. A movable contact carrier 120 is pivoted by means of a pin 121 to a pair of toggle arms or links 122 and 123. The links 122 and 123 are connected to the collar 108 by a pin 124. A pair of tension springs 125 and 126 are secured to the pins 127 and 128 (as shown in Figure 6). These springs act first to resist the movement of the links 122 and 123 in either direction but finally when their resistance is overcome they effect a quick movement of the links. A movable switch contact 129 is mounted upon the movable carrier 120 preferably by means of a resilient arm 130.

A blow-out coil 131 is mounted within the casing 102, one terminal of the coil being electrically connected by a lead 132 with a fixed switch contact 133 and the other terminal with the movable contact 129 through a lead 134. This coil effectively suppresses any arc that may be drawn between the fixed and movable switch contacts 133 and 129. As an additional precaution the fixed contact is mounted within an arc chute 135. The arc chute is preferably moulded of a fire-proof material and is mounted upon the base portion 101. A stop 136 within the chute limits the opening movement of the movable contact 129.

The governing switch mechanism just described is electrically connected in series with a magnetic coil 137 so as to control the valve 97. For this purpose a lead 138 is provided connecting one terminal 139 of the coil 137 with the movable contact 129. The other terminal 140 of the coil is electrically connected with one line of the power circuit, such as 38, and the fixed contact 133 is electrically connected with another line such as 37. Thus when the governing switch is closed the coil 137 is under the influence of the main power circuit.

The governing switch is closed by the upward movement of contact 129 toward and against fixed contact 133. This movement is effected by the downward movement of collar 108 and diaphragm plate 103 under the action of springs 106 and 107, thus causing a rocking of the movable contact carrier 120 about its pivot 121 in a clockwise direction. The opening of the switch is accomplished by the upward movement of collar 108 under the action of the fluid pressure under the diaphragm 113.

The coil 137 is preferably wound upon a brass sleeve 137'. The coil 137 and core 141 constitute an iron-clad magnet of which the casting 142 forms the return path. The valve 97 is operatively connected with the casting 142 by a member 143 so that when normal current is passing through the coil 137, the valve 97 is forced to the right (Figure 5) against the action of spring 191 to close port 97' and open port 99. The valve in this position cuts off the supply of air from the main reservoir to the auxiliary reservoir through pipe 92 and establishes comunication between the auxiliary reservoir and the main switch operating cylinder 47 in the manner before described.

The operation of the entire control system will now be briefly summarized. When the compressor is at rest the main switch 33, the cut-out switch 62 and the governing switch just described are open and the valve 97 is held by the spring 191 in such position that port 97' is open and port 99 is closed. The auxiliary reservoir 58 is therefore in communication with the main reservoir 12 through pipe 92. The chamber 117 is always in communication with the main reservoir through the pipe 118, and at this time the pressure in the main reservoir and consequently in the chamber 117 is sufficient to maintain the diaphragm 113 and hence collar 108 in the upper position. As soon as the pressure in the main reservoir has fallen to a predetermined minimum springs 106 and 107 overcome the resistance of springs 125 and 126 and the fluid pressure in the chamber 117 with the result that the collar 108 is forced downwardly and the movable contact 129 is snapped against the fixed contact 133 and the governing switch is closed. The circuit is thus completed through the coil 137 and the casting 142 and the valve 97 is moved to the right.

Communication is thus cut off between the main reservoir 12 and the auxiliary reservoir 58 and communication between the auxiliary reservoir 58 and the main switch operating cylinder 47 is established through pipe 57. The fluid pressure in the auxiliary reservoir, which is substantially equal to main reservoir pressure at this time, is thus transmitted to the main switch operating cylinder to close the main switch 33 and start the motor and compressor. As the compressor speed builds up the pump 16 effects a corresponding increase in pressure in the hydraulic system and in the cut-out switch actuating cylinder 28 until the cut-out switch is closed, and the latch lever 61 is released. If the compressor, motor, and motor circuit are in proper working condition this action occurs and the main switch is latched in closed position before the fluid pressure in the main switch cylinder 47 has been depleted by leakage through the bleed opening 59. At the same time the pressure in the accumulating cylinder 30 is building up so that when the compressor has reached full speed the pressure has so increased that the piston 72 is raised and the compressor is loaded by releasing the intake valve 11.

Under normal running conditions all the parts remain in this condition until a maximum cut-out pressure has been reached in the main reservoir. When this occurs, diaphragm 113 and collar 108 are raised against the resistance of springs 106 and 107 and springs 125 and 126 and the governing switch is opened. This deenergizes the coil 137 and permits the spring 191 to move the valve 97 to the left to cut off communication between the main switch cylinder 47 and the auxiliary reservoir and to establish communication between the main reservoir 12 and the auxiliary reservoir 58. As soon as fluid pressure has been thus established in the auxiliary reservoir, this pressure which is substantially equal to the maximum cut-out pressure in the main reservoir, is transmitted to the chamber 85 in the cylinder head 86 of the cut-out switch cylinder 28, through pipe 84. The piston 92 is thus actuated against spring 88 to raise valve 87 and permit escape of the oil from the cylinder 28 through the port 89. This effects a reduction in the entire hydraulic system so that the piston 72 is first lowered to unload the compressor and the cut-out switch piston 64 is lowered to open the cut-out switch and trip the latch lever 61 to release and open the main switch and stop the motor and compressor.

Should there be a failure in the electrical power circuit for the motor while the compressor is running the magnet coil 137 would not offer sufficient resistance to the action of valve spring 91 with the result that the valve 97 would move to the left under the action of the spring and the auxiliary reservoir would again be filled with fluid under main reservoir pressure and the compressor would be unloaded and brought to rest in the manner just described. Should this electrical failure disappear or be corrected the valve 97 would again move to the right under the action of the reenergized coil 137 and the main switch would again be closed by the action of the fluid in the auxiliary reservoir 58 and the motor and compressor would again be started in the manner above described.

Numerous changes may be made in the embodiment of the invention hereinabove described without departing from or sacrificing any of the advantages of the invention defined in the following claims.

I claim:—

1. The combination of a motor, a separate main switch, a separate starting resistance cut-out switch, means for actuating said switches independently in turn to start said motor, a pressure controlled governing switch, and pneumatic means controlled by said governing switch for controlling the actuation of said cut-out switch and said main switch in turn to stop said motor.

2. The combination of a motor, a main switch, means for closing said main switch to start said motor, a starting resistance cut-out switch, a hydraulic system for actuating said cut-out switch as said motor comes up to speed, a governing switch, and means associated with said hydraulic system and controlled by said governing switch for actuating said cut-out switch and said main switch to automatically stop said motor.

3. The combination of a motor, a main switch, means for closing said main switch to start said motor, a starting resistance cut-out switch, a machine driven by said motor and having a lubricating system, means controlled by said lubricating system for actuating said cut-out switch as said motor comes up to speed, a governing switch and means associated with said lubricating system and controlled by said governing switch for releasing said cut-out switch and said main switch to automatically stop said motor.

4. The combination of a compressor, a fluid system fed by said compressor comprising a main reservoir, a driving motor, switch mechanism therefor, an auxiliary fluid reservoir, a fluid pressure connection between said auxiliary reservoir and a part of said switch mechanism, a magnetic valve mechanism for controlling communication through said respective connections to start said motor by a limited charge of pressure fluid in said auxiliary reservoir, and a connection between said auxiliary reservoir and another part of said switch mechanism for stopping said motor by the pressure in said auxiliary reservoir.

5. The combination of a compressor, a fluid system fed by said compressor, a driving motor, switch mechanism therefor, an auxiliary fluid reservoir, a fluid pressure connection between said system and said reservoir whereby fluid may enter said reservoir from said system, a connection between said reservoir and a part of said switch mechanism for stopping said motor by the pressure in said reservoir, a connection between said reservoir and another part of said switch mechanism for starting said motor, and electrically controlled valve mechanism for controlling communication through said first named connection and through said last named connection.

6. The combination of a compressor, a fluid system fed by said compressor, a driving motor, switch mechanism therefor, a governing switch controlled by fluid pressure in said system, an auxiliary fluid reservoir, a connection between said system and said reservoir whereby fluid may enter said reservoir from said system, a connection between said reservoir and a part of said switch mechanism for stopping said motor by the pressure in said reservoir, a connection between said reservoir and another part of said switch mechanism for starting said motor, valve mechanism for controlling communication through said first named connection and through said last named connection to effect the stopping and starting of the motor, and means controlled by said governing switch for controlling said valve mechanism.

7. In combination, a motor, a compressor driven by said motor, a main reservoir connected to said compressor, an auxiliary reservoir, a main switch for the motor, an operating cylinder for the switch, a pressure controlled governor switch which is subjected to pressure of air in the main reservoir, valve means between the main and the auxiliary reservoirs, and between the auxiliary reservoir and the switch operating cylinder, and means controlled by the governing switch for operating said valve means.

8. In combination, a motor, a starting switch for the motor, a main pressure reservoir, an auxiliary reservoir, a switch operating cylinder, a valve for charging the auxiliary reservoir from the main reservoir and for connecting the auxiliary reservoir to the switch cylinder, and means subject to the electrical condition of the line for controlling the valve.

9. In combination, a motor, a starting switch for the motor, a main reservoir, an auxiliary reservoir, a switch operating cylinder for the starting switch, a valve for charging the auxiliary reservoir from the main reservoir and for connecting the auxiliary reservoir to the switch cylinder and means subject jointly to the electrical condition of the line and the pressure in the main reservoir for operating said valve.

10. The combination of a compressor, a fluid container fed by said compressor, a supply circuit, an electric drive mechanism for said compressor, and means controlled by the pressure of fluid in said container for starting said mechanism, said means including and operating through a device controlled by the electrical condition of said supply circuit for stopping or restarting said mechanism.

11. The combination of a compressor, a fluid container fed thereby, a supply circuit, an electric drive mechanism for said compressor, and means for starting said mechanism, said means including and working through a device for testing the electrical condition of said supply circuit, and for stopping and restarting said mechanism in accordance with such condition.

12. In combination, a motor, an electric line for the motor, a compressor, a reservoir, a lubricating system for the compressor, a starting and loading system for the motor and the compressor, said system comprising means responsive to low pressure in the reservoir for starting the motor, and means responsive to either failure of the motor to attain or maintain a predetermined speed, or failure of the lubricating system, or to the attainment of a predetermined pressure in the reservoir, or to a failure of voltage on the line for stopping the motor.

13. In combination, a motor, a pump, a pressure system connected to the pump, starting means for the motor comprising a fluid pressure cylinder, a pressure controlled switch responsive to low pressure to close the circuit of said motor and responsive to high pressure to open the same, a valve, a magnet for opening the valve to admit pressure to the switch cylinder and a spring for closing said valve.

14. In combination, a motor, a pump, a pressure system connected to the pump, starting means for the motor comprising a fluid pressure cylinder, a valve, a magnet for opening the valve to admit pressure to the switch cylinder to close the main switch, and a spring for closing said valve, a pressure controlled switch responsive to low pressure to close the circuit of said magnet and responsive to high pressure to open the same, and means for automatically depleting the pressure applied to the switch cylinder at the end of a predetermined period.

15. In combination, a motor, a compressor, a main reservoir, an auxiliary reservoir, starting means for the compressor comprising a switch and an operating cylinder, a pressure controlled electric governor responsive to the pressure in the main reservoir, a valve controlling communication between the main and auxiliary reservoirs and between the auxiliary reservoir and the switch cylinder, a magnet controlled by the governor for operating the valve to connect the auxiliary reservoir and the switch cylinder, and a spring for operating the valve to connect the auxiliary reservoir and the main reservoir.

16. In combination, a motor, a compressor, a main reservoir, an auxiliary reservoir, starting means for the compressor comprising a main switch, an operating cylinder for the main switch, said operating cylinder having a flow down port, a detent for the main switch, a starting resistance, a cut-out switch for the starting resistance, a pressure controlled electric governor responsive to the pressure in the main reservoir, a valve controlling communication between the main reservoir and the auxiliary reservoir and between the auxiliary reservoir and the switch cylinder, a magnet controlled by the governor for operating the valve to connect the auxiliary reservoir and the switch cylinder, a spring for operating the valves to connect the auxiliary reservoir and the main reservoir, means responsive to the speed of the motor for operating the cut-out switch and for applying the detent to the main switch, and pneumatic means connected to the auxiliary reservoir for causing opening first of said cut-out switch and then of the main switch.

17. In an electric controlling device, the combination of a rheostat, a pressure actuated motor for actuating the rheostat, a valve controlling the motor, a connection between the valve and the motor, a constantly open leakage port tending to deplete the pressure in said motor, and a quick release valve for suddenly releasing the pressure in said motor to permit free flow of fluid from said motor when the pressure in said motor drops below a predetermined minimum.

18. In combination, a compressor, a reservoir, a motor, a line for the motor, a starting unit for the motor, means for operating the starting unit to start the motor at a minimum pressure in the reservoir, and both speed controlled means and low voltage control means for operating said unit to open the circuit of the motor upon either predetermined slowing down of the motor or upon failure of voltage on the line.

19. In combination, a compressor, a reservoir, a motor, a circuit including a starting switch, a pneumatic motor for the starting switch, a valve controlling said motor, an electromagnet controlling the valve, said electromagnet being connected to the motor circuit for no voltage control, and a pressure controlled switch subject to the pressure in the reservoir for opening and closing the circuit of the electromagnet.

20. In combination, a compressor, a reservoir, a motor, a circuit for the motor, a starting unit for the motor comprising a main switch for opening and closing the circuit, a fluid pressure motor therefor, a resistance in series when the main switch is closed, and resistance cut-out means including a fluid pressure motor for cutting out the resistance and holding the circuit closed at the main switch, a control valve for the first motor, a pressure sensitive switch controlled by reservoir pressure, an electromagnet adapted to be energized by current from the same source as that which supplies the motor for actuating said control valve to govern said motor, said electromagnet having its circuit cut through said switch.

21. In combination, a compressor, a reservoir, a motor, a circuit for the motor, an electrical starting unit comprising a switch, a starting resistance and means for cutting out said resistance, said means including a fluid pressure cylinder having a piston, said piston upon being subject to pressure cutting out the resistance and holding the circuit closed, and upon release of pressure inserting the resistance and causing the opening of the circuit, a valve for admitting compressed air to and exhausting the same from said cylinder, means for controlling said valve comprising a voltage coil bridged across the motor circuit and a pressure sensitive element subject to the pressure of said reservoir controlling said coil.

In witness whereof I hereunto subscribe my name this 30th day of October, 1919.

BURTON S. AIKMAN.